United States Patent
Valentine et al.

(10) Patent No.: US 9,118,940 B2
(45) Date of Patent: Aug. 25, 2015

(54) VIDEO BANDWIDTH ALLOCATION IN A VIDEO CONFERENCE

(75) Inventors: Matthew F. Valentine, Chapel Hill, NC (US); James P. Ashley, Naperville, IL (US)

(73) Assignee: Google Technology Holdings LLC, Mountain View, CA (US)

(*) Notice: Subject to any disclaimer, the term of this patent is extended or adjusted under 35 U.S.C. 154(b) by 321 days.

(21) Appl. No.: 13/561,689

(22) Filed: Jul. 30, 2012

(65) Prior Publication Data

US 2014/0028785 A1 Jan. 30, 2014

(51) Int. Cl.

| | |
|---|---|
| H04N 7/14 | (2006.01) |
| H04N 21/2365 | (2011.01) |
| H04N 7/15 | (2006.01) |
| H04N 21/2385 | (2011.01) |
| H04L 29/06 | (2006.01) |
| H04L 12/18 | (2006.01) |

(52) U.S. Cl.
CPC ...... *H04N 21/23655* (2013.01); *H04L 12/1822* (2013.01); *H04L 65/4038* (2013.01); *H04N 7/152* (2013.01); *H04N 21/2385* (2013.01); *H04L 65/1086* (2013.01)

(58) Field of Classification Search
USPC .............. 348/14.01–14.09, 14.12, 14.13; 379/202.01
See application file for complete search history.

(56) References Cited

U.S. PATENT DOCUMENTS

| | | | |
|---|---|---|---|
| 5,392,223 A | 2/1995 | Caci | |
| 6,134,232 A | 10/2000 | Ashley et al. | |
| 6,167,033 A * | 12/2000 | Chang et al. | 370/263 |
| 6,396,816 B1 | 5/2002 | Astle et al. | |
| 7,593,032 B2 | 9/2009 | Civanlar et al. | |
| 7,694,002 B2 * | 4/2010 | Vadlakonda et al. | 709/228 |
| 7,734,693 B2 * | 6/2010 | Ardulov | 709/204 |
| 7,768,543 B2 * | 8/2010 | Christiansen | 348/14.08 |
| 2005/0099492 A1 * | 5/2005 | Orr | 348/14.08 |
| 2005/0243168 A1 * | 11/2005 | Cutler | 348/14.12 |
| 2005/0248652 A1 * | 11/2005 | Firestone et al. | 348/14.09 |
| 2007/0263824 A1 * | 11/2007 | Bangalore et al. | 379/202.01 |
| 2010/0165072 A1 | 7/2010 | Oike | |
| 2011/0103468 A1 | 5/2011 | Polisetty et al. | |
| 2011/0292163 A1 | 12/2011 | Haltom et al. | |
| 2012/0262538 A1 * | 10/2012 | Wu et al. | 348/14.09 |
| 2013/0021432 A1 * | 1/2013 | Kalipatnapu et al. | 348/14.09 |
| 2013/0135523 A1 * | 5/2013 | Ramalho et al. | 348/441 |

FOREIGN PATENT DOCUMENTS

| | | |
|---|---|---|
| EP | 1496700 A | 1/2005 |
| WO | 2007145686 A | 12/2007 |

OTHER PUBLICATIONS

LifeSize, Best Embedded Multipoint Bridging, http://www.lifesize.com/Gallery_andResources/The_lifeSize_Advantage/Best_Embedded, downloaded from Internet: May 16, 2012, one page.
PR Newswire, United Business Media, "Interop Attendees Unprepared for Video-Conference Bandwidth Surge", Las Vegas, May 9, 2012, PRNewswire/—Interop, http://www.prnewswire.com/news-releases/interop-attendees-unprepared-for-video-conference-bandwidth-surge-150877905.html, copyright 2012 by Network Instruments, all pages.
PCT International Search Report and Written Opinion dated Jul. 10, 2014 for PCT International Application No. PCT/US2013/051557, 9 pages.

* cited by examiner

*Primary Examiner* — Olisa Anwah
(74) *Attorney, Agent, or Firm* — Remarck Law Group PLC (57) ABSTRACT

Communicating information exchanged in a video conference. Responsive to detecting a change in an amount of audio information generated by at least one participant in the video conference, identifying a first of the plurality of participants in the video conference that currently is a primary presenter in the video conference, allocating a first level of video bandwidth to communicate video information generated in the video conference to a client device, by the primary presenter in the video conference, and allocating a second level of video bandwidth to communicate video information generated in the video conference to a client device, by one or more other participants, who currently are not the primary presenter in the video conference, wherein the second level of video bandwidth is less than the first level of video bandwidth.

18 Claims, 7 Drawing Sheets

| | Downlink Network Bandwidth | Participant 1 Weighted Video BW Allocation % | Participant 2 Weighted Video BW Allocation % | Participant 3 Weighted Video BW Allocation % | Participant 4 Weighted Video BW Allocation % |
|---|---|---|---|---|---|
| Participant 1 122 | 500 kbps | N/A | 74% | 13% | 13% |
| Participant 2 132 | 5000 kbps | 40% | N/A | 30% | 30% |
| Participant 3 142 | 250 kbps | 0% | 100% | N/A | 0% |
| Participant 4 502 | 500 kbps | 13% | 74% | 13% | N/A |
| | ↑ 510 | ↑ 512 | ↑ 514 | ↑ 516 | ↑ 518 |

VIDEO BANDWIDTH ALLOCATION IN A VIDEO CONFERENCE

BACKGROUND OF THE INVENTION

With continued proliferation of relatively low cost, high capacity, mobile communication networks, the use of mobile video conferencing continues to grow. Mobile video conferencing is the conduct of a video conference among a plurality of participants at two or more locations via a one or more communication networks. A video conference provides simultaneous multi-way video and audio transmissions between the locations, thus enabling the participants to communicate with each other, both audibly and visually, in real time, even when the participants are remotely located with respect to one another. In this regard, a video conference is a specific form of video telephony.

DETAILED DESCRIPTION

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Arrangements described herein relate to communicating information exchanged in a video conference. Network bandwidth available to communicate information exchanged in the video conference can be monitored to determine when it is appropriate to selectively allocate video bandwidth for video information generated in the video conference, and the video bandwidth can be allocated accordingly. In illustration, a participant in the video conference who is a primary presenter in the video conference can be allocated a first level of video bandwidth to communicate video information, while participants who are not primary presenters (at a particular time) can be allocated other levels of video bandwidth to communicate video information, wherein the other levels of video bandwidth are less than the first level. Moreover, another level of video bandwidth can be zero, meaning that video information from one or more other participants can be ceased from being presented in the video conference, though the present invention is not limited in this regard. As used herein, a participant of a video conference is a human being generating and/or receiving audio and/or video information in a video conference.

Figure 1:
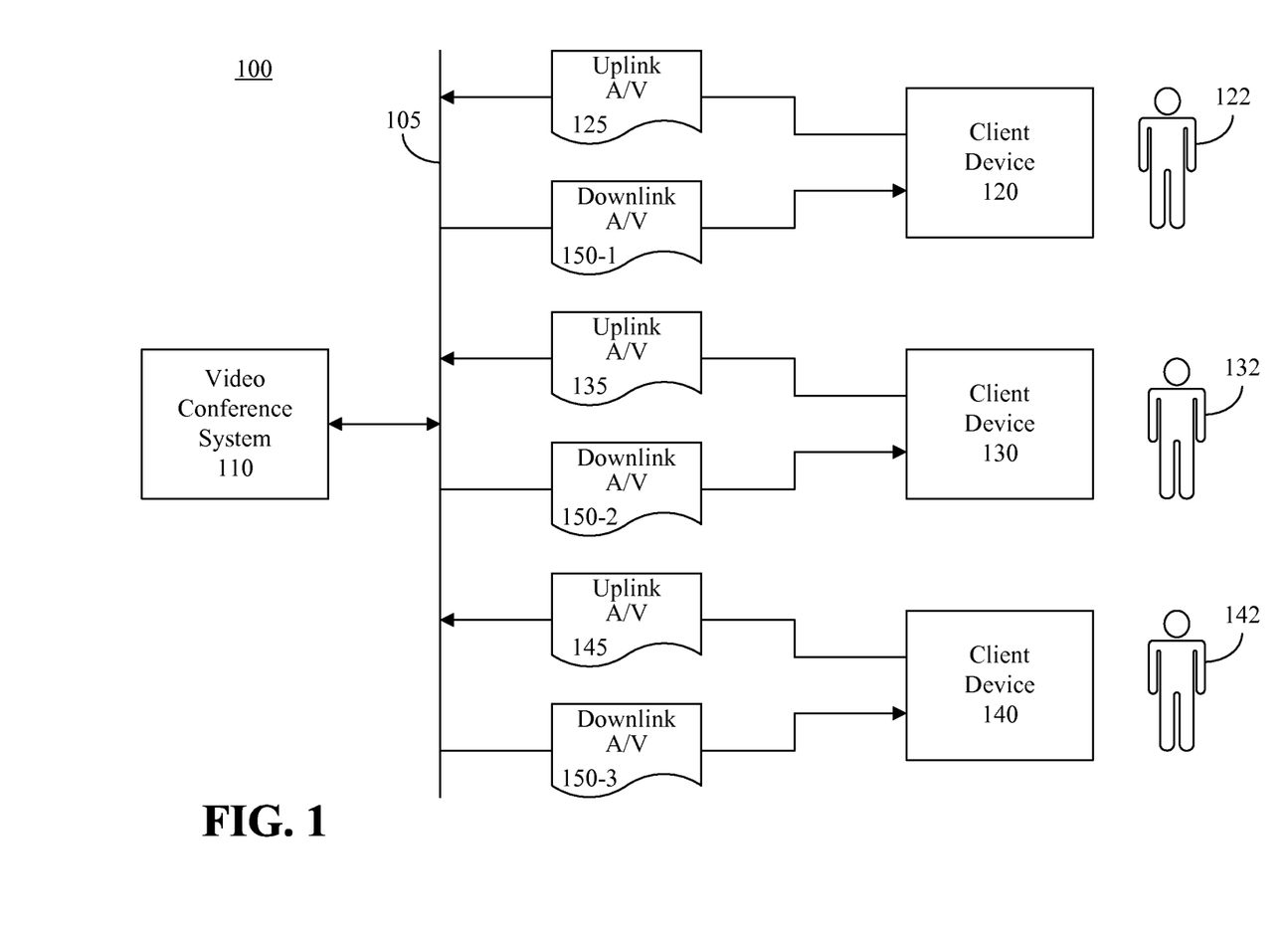
FIG. 1 depicts a block diagram of a system configured to communicate information exchanged in a video conference, which is useful for understanding various arrangements described herein.
Figure 2:
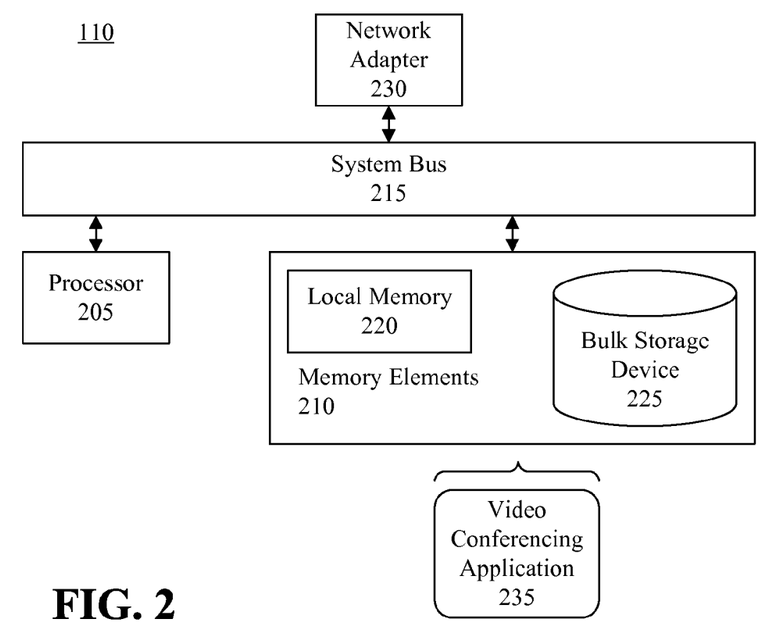
FIG. 2 depicts a block diagram of a video conference system, which is useful for understanding various arrangements described herein.

FIG. 1 depicts a block diagram of a system 100 configured to communicate information exchanged in a video conference, which is useful for understanding various arrangements described herein. The system 100 can include a video conference system 110. FIG. 2 depicts a block diagram of the video conference system 110, which is useful for understanding various arrangements described herein.

As depicted in FIG. 2, the video conference system 110 can include at least one processor 205 coupled to memory elements 210 through a system bus 215 or other suitable circuitry. As such, the video conference system 110 can store machine-readable or machine-usable program code within the memory elements 210. The processor 205 can execute the program code accessed from the memory elements 210 via the system bus 215. In one arrangement, the video conference system 110 can be implemented as a video conference server, using suitable hardware, which is further configured to operate as described herein. In another arrangement, the video conference system 110 can be implemented as a video conference bridge (e.g., a multipoint control unit), using suitable hardware, which is further configured to operate as described herein. It will be appreciated by those of ordinary skill in the art, however, that the video conference system 110 can be implemented in the form of any system including a processor and memory that is capable of performing the functions and/or operations described within this specification as being performed by the video conference system 110.

The memory elements 210 can include one or more physical memory devices such as, for example, local memory 220 and one or more bulk storage devices 225. Local memory 220 refers to RAM or other non-persistent memory device(s) generally used during actual execution of the program code. The bulk storage device(s) 225 can be implemented as a hard disk drive (HDD), solid state drive (SSD), read only memory (ROM), or other persistent data storage device. The video conference system 110 also can include one or more cache memories (not shown) that provide temporary storage of at least some program code in order to reduce the number of times program code must be retrieved from the bulk storage device 225 during execution.

Input/output (I/O) devices such as a keyboard (not shown), a display (not shown), and a pointing device (not shown) optionally can be coupled to the video conference system 110. The I/O devices can be coupled to the video conference system 110 either directly or through intervening I/O controllers. One or more network adapters 230 also can be coupled to the video conference system 110 to enable the video conference system 110 to become coupled to client devices, other systems, computer systems, remote printers, and/or remote storage devices through intervening private or public networks. Modems, cable modems, and Ethernet cards are examples of different types of network adapters 230 that can be used with the video conference system 110.

As pictured in FIG. 2, the memory elements 210 can store a video conferencing application 235 or other suitable program code. The video conferencing application 235, being implemented in the form of executable program code, can be executed by the video conference system 110 and, as such, can be considered part of video conference system 110. The video conferencing application 235 can be executed by the processor 205 to perform the functions and processes described in this specification that are performed by the video conference system 110.

Referring again to FIG. 1, a plurality of client devices 120, 130, 140 can be communicatively linked to the video conference system 110 via one or more suitable communication networks 105. Each client device 120, 130, 140 can be used by at least one respective participant 122, 132, 142 to participate in the video conference. As used herein, reference to receiving uplink audio and/or video information from a participant 122, 132, 142 means receiving the uplink audio and/or video information from a respective client device 120, 130, 140 being used by that participant 122, 132, 142 to participate in the video conference. Further, as used herein, reference to communicating downlink audio and/or video information 150 to a participant 122, 132, 142 means communicating the downlink audio and/or video information 150 to a respective client device 120, 130, 140 being used by that participant 122, 132, 142 to participate in the video conference.

The communication network(s) 105 can include the Internet, one or more cellular communication networks, one or more local area networks (LANs), one or more wireless LANs (WLANs), one or more wide area networks (WANs), one or more wireless WANs, one or more direct wireless communication links, and/or the like. The client devices 120, 130, 140 can be wireless communication devices configured to communicate with the video conference system 110, via respective wireless communication links to the communication network(s) 105, and be used by respective participants to participate in the video conference. One or more additional client devices (not shown) also can be communicatively linked to the video conference system 110, via one or more wired or wireless communication links to the communication network(s) 105, and be used by respective participants to participate in the video conference. Moreover, the communication network(s) 105 may be dynamic in nature. For example, in a wireless environment, the client device(s) 120, 130, 140 may hand off to an auxiliary network, for instance from WAN to LAN.

Figure 3:
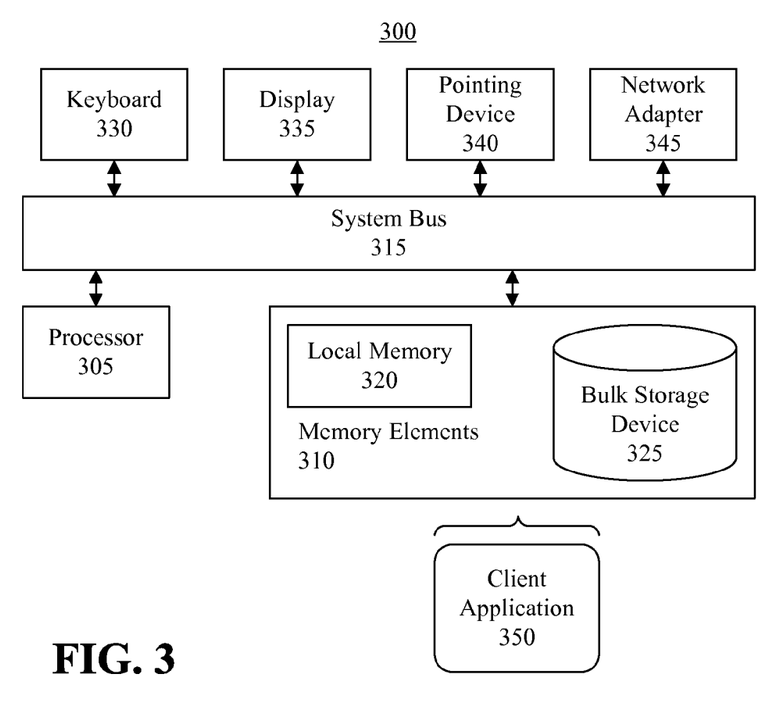
FIG. 3 depicts a block diagram of a client device, which is useful for understanding various arrangements described herein.

FIG. 3 depicts a block diagram of a client device 300, which is useful for understanding various arrangements described herein. The client device 300 is representative of the client devices 120, 130, 140, and any other client devices that may communicate with the video conference system to participate in a video conference.

As depicted in FIG. 3, the client device 300 can include at least one processor 305 coupled to memory elements 310 through a system bus 315 or other suitable circuitry. As such, the client device 300 can store machine-readable or machine-usable program code within the memory elements 310. The processor 305 can execute the program code accessed from the memory elements 310 via the system bus 315. In one arrangement, the client device 300 can be implemented as a computer, a mobile computer, a laptop computer, a tablet computer, a smart phone, a personal digital assistant, or the like. It should be appreciated, however, that the client device 300 can be implemented in the form of any system including a processor and memory that is capable of performing the functions and/or operations described within this specification as being performed by the client devices 120, 130, 140 of FIG. 1.

The memory elements 310 can include one or more physical memory devices such as, for example, local memory 320 and one or more bulk storage devices 325. The client device 300 also can include one or more cache memories (not shown) that provide temporary storage of at least some program code in order to reduce the number of times program code must be retrieved from the bulk storage device 325 during execution.

Input/output (I/O) devices such as a keyboard 330, a display 335, and a pointing device 340 can be coupled to the client device 300. The I/O devices can be coupled to the client device 300 either directly or through intervening I/O controllers. One or more network adapters 345 also can be coupled to the client device 300 to enable the client device 300 to become coupled to the video conference system, other devices or systems, computer systems, remote printers, and/or remote storage devices through intervening private or public networks. Wireless transceivers, modems, wireless modems, cable modems, Ethernet cards, and wireless network adapters are examples of different types of network adapters 345 that can be used with the client device 300.

By way of example, the network adapter 345 can be a transceiver configured to modulate and demodulate signals to convert signals from one form to another, and can transmit and/or receive such signals over one or more various wireless communication networks. In illustration, the transceiver can communicate data via 2G, 3G, 4G, GSM, LTE, EVDO, UMB, GPRS, EUTRAN, TDMA, CDMA, WCDMA, UMTS, OFDM, HSPA+, direct wireless communication, etc. Further, the network adapter 345 may be embodied as a wireless network adapter configured to communicate data via IEEE 802 wireless communications, for example, 802.11 and 802.16 (WiMax™), mobile WiMax™, WPA, or WPA2. Still, the invention is not limited to these examples and the network adapter 345 can be configured to communicate RF signals in accordance with any suitable communications standards, protocols, and/or architectures, or a suitable combination of such standards, protocols, and/or architectures. The network adapter 345 also may be configured to communicate via a wired communication link, for example in accordance with TCP/IP.

As pictured in FIG. 3, the memory elements 310 can store a client application 350 or other suitable program code. The client application 350, being implemented in the form of executable program code, can be executed by the client device 300 and, as such, can be considered part of client device 300. The client application 350 can be executed by the processor 305 to perform the functions and processes described in this specification that are performed by the client devices 120, 130, 140 of FIG. 1. In one arrangement, the client application 350 can be a video conferencing application, such as those known in the art, further configured to operate as described herein. In another arrangement, the client application 350 can be a web browser, and one or more plug-ins can be provided to configure the web browser to operate as a client in video conferences as described herein.

Referring again to FIG. 1, During the video conference, the video conference system 110 can receive uplink audio/video information 125, 135, 145 generated by the respective participants 122, 132, 142 from the respective client devices 120, 130, 140, assemble the uplink audio/video information 125, 135, 145 into downlink audio/video information 150, and communicate the downlink audio/video information 150 to the client devices 120, 130, 140 for presentation to the respective participants 122, 132, 142.

In accordance with the arrangements described herein, the video conference system 110 can monitor available bandwidth of the communication network(s) 105 to determine whether there is sufficient bandwidth to communicate the downlink audio/video information 150 at full data rates. When there is not sufficient bandwidth, the video conference system 110 can detect audio information contained in the uplink audio/video information 125, 135, 145 and process the audio information to identify which of a plurality of participants in the video conference currently is a primary presenter in the video conference. For example, the video conference system 110 can identify which of the participants 122, 132, 142 is generating the greatest amount of audio information (e.g., speech data), and identify that participant as the primary presenter. For example, the video conference system 110 can implement voice activity detection to identify from among the plurality of participants 122, 132, 142 who currently is the primary presenter in the video conference, and the primary presenter can be allocated more video bandwidth as compared to the other participants.

In another arrangement, to determine which participant 122, 132, 142 currently is the primary presenter in the video conference, the video conference system 110 can detect a visual presentation presented during the video conference, such as one or more screens of data (e.g., slides), one or more video feeds, or the like. The video conference system 110 can determine which participant 122, 132, 142 is providing the visual information, and identify that participant as the primary presenter in the video conference.

Further, the video conference system 110 can allocate a first level of video bandwidth to selectively communicate in the downlink audio/video information 150 video information generated in the video conference by the first participant (e.g., the participant 122) who currently is the primary presenter in the video conference, and allocate one or more other lower levels of video bandwidth to selectively communicate in the downlink audio/video information 150 video information generated in the video conference by one or more other participants (e.g., the participants 132, 142) who currently are not the primary presenter in the video conference. For example, a second level of video bandwidth can be allocated to video information generated by the participant 132, and a third level of video bandwidth can be allocated to video information generated by the participant 142. In one arrangement, the second level of video bandwidth, or the third level of video bandwidth, can be zero ("0"), in which case the downlink audio/video information 150 would not contain video information generated by one or more of the participants 132, 142. When network bandwidth conditions improve (e.g., when the network bandwidth increases), the level of video bandwidth allocated to communicate the video information generated in the video conference by the other participants 132, 142 can be increased by the video conference system 110. The level of video bandwidth allocated to communicate the video information generated in the video conference by the participant 122 also can be increased by the video conference system 110.

Accordingly, the video conference system 110 can dynamically adapt the video bandwidth allocations based on network bandwidth conditions, and mitigate the risk of video bandwidth allocated for video information provided by the primary presenter becoming too low for smooth delivery of video information. The amount of bandwidth required to communicate audio information typically is much less than the amount of bandwidth required to communicate video information. Thus, the video conference system 110 need not reduce audio bandwidth during the teleconference, thereby ensuring that each of the participants in the video conference may be heard clearly in the teleconference. That being said, in one arrangement, the video conference system 110 also can selectively reduce audio bandwidth for audio information provided by participants who are not the primary presenter, though the present arrangements are not limited in this regard.

Further, the video conference system 110 can process the audio information to identify when the primary presenter in the video conference changes from one participant to another. For example, the video conference system 110 can detect a change in an amount of audio information (e.g., speech data) generated by at least one of the plurality of participants 122, 132, 142 in the video conference. When the video conference system 110 detects such a change, the video conference system 110 can reallocate the respective levels of video bandwidth to provide greater video bandwidth for video information provided to other participants by the new primary presenter.

In another aspect of the present arrangements, the video conference system 110 can dynamically adapt the amount of video bandwidth used to communicate the various video information individually for each of the downlink audio/video information 150-1, 150-2, 150-3. For example, the video information generated by a particular participant, such as the participant 142, can be removed from the downlink audio/video information 150-3 communicated to that participant 142, while the downlink audio/video information 150-3 still includes video information generated by the other participants 122, 132. If the network bandwidth available to the client device 130 is severely limited, the downlink audio/video information 150-2 may include only video information generated by the primary presenter, such as the participant 122. Further, downlink video bandwidth to any of the client devices 120, 130, 140 (for respective participants 122, 132, 142) can be dynamically distributed so that the amount of downlink video bandwidth allocated for video information generated any other particular participant 122, 132, 142 is based upon the amount of audio information generated by such participant 122, 132, 142.

By way of example, if the network bandwidth available to the client device 120 of the participant 122 is sufficient to communicate video information provided by each of the other participants 132, 142 at a full data rate, such video information can be provided in the downlink audio/video information 150-1 at full data rate. Meanwhile, the network bandwidth available to the client device 130 of the participant 132 may be insufficient to communicate video information provided by each of the other participants at a full data rate. Accordingly, as provided in the downlink audio/video information 150-2, the video information provided by the primary presenter can be communicated at the first level of video bandwidth, and the video information provided by other presenters can be communicated in the downlink audio/video information 150-2 at one or more other, lower, respective levels of video bandwidth, or even ceased. For example, video information provided by the participant 142 can provided to the participant 132 in the downlink audio/video information 150-2 at a second level of video bandwidth, and video information provided by another participant (not shown) can provided to the participant 142 in the downlink audio/video information 150-3 at a third level of video bandwidth. The level of video bandwidth to communicate video information in the downlink audio/video information 150-3 can be dynamically selected in a similar manner based on the network bandwidth available to the client device 140.

In one arrangement, to allocate respective video bandwidths to video information received from participants, the video conference system 110 can compress the video information received from one or more participants 122, 132, 142 by selectively removing data from the video information, and communicate the compressed video information to other participants 122, 132, 142 via respective downlinks. In another arrangement, the video conference system 110 can communicate at least one message to respective video encoders for each of the respective client devices 120, 130, 140, each video encoder encoding video information generated by the respective participants 122, 132, 142, indicating to the video encoders to encode the video information at a bit rate not to exceed a threshold value. The video conference system 110 can receive the video information generated by the participants at the specified bit rates, and communicate the video information to other participants in the video conference.

In yet another arrangement, the uplink video information can be generated by the respective client devices 120, 130, 140. each using a base video layer and one or more enhancement video layers. The enhancement video layers can provide additional video data which may be added to the base video layer to increase video resolution, as is known to those skilled in the art. The video conference system 110 can selectively choose whether to communicate one or more video enhancement layers in the respective downlink audio/video information 150-1, 150-2, 150-3 depending on network bandwidth currently available to the respective client devices 120, 130, 140. In this regard, the video conference system 110 can indicate to the respective client devices 120, 130, 140 the resolutions to be used for presenting the respective video information, the size of windows to be used for presenting the respective video information, and the like. For example, the video conference system 110 can communicate to the respective client devices 120, 130, 140 a first parameter corresponding to a size of a first window in which video information generated by the primary presenter is to be presented, and other parameters corresponding to respective sizes of other windows in which video information generated by other participants are to be presented. The respective client devices 120, 130, 140 can present the video information presented by primary presenter and other participants in corresponding windows, each of which is presented to have a size indicated by a corresponding parameter.

Moreover, the client devices 120, 130, 140 each may individually determine whether they have sufficient network bandwidth available on the uplink channel to communicate one or more enhancement video layers. If so, they can choose to communicate the enhancement video layer(s) to the video conference system 110. If not, they can choose not to communicate the enhancement video layer(s) to the video conference system 110, or choose to cease communicating video information entirely. In another arrangement, such determinations can be made by the video conference system 110, and the video conference system 110 can communicate respective messages (e.g., control information) to the client devices 120, 130, 140 indicating to each client device 120, 130, 140 whether to provide the base video layer, provide the base video layer with one or more video enhancement layers, or to cease providing video information. For example, the video conference system 110 can indicate a particular protocol to be used by the respective client devices 120, 130, 140 to communicate video information. In yet another arrangement, the video conference system 110 can indicate to each client device 120, 130, 140 a bit rate to be used to communicate the video information, and each of the client devices 120, 130, 140 can choose whether to communicate video, whether to communicate only base layer video, or whether to communicate base layer video with one or more enhancement layers based on their respective bit rate allocations.

Figure 4:
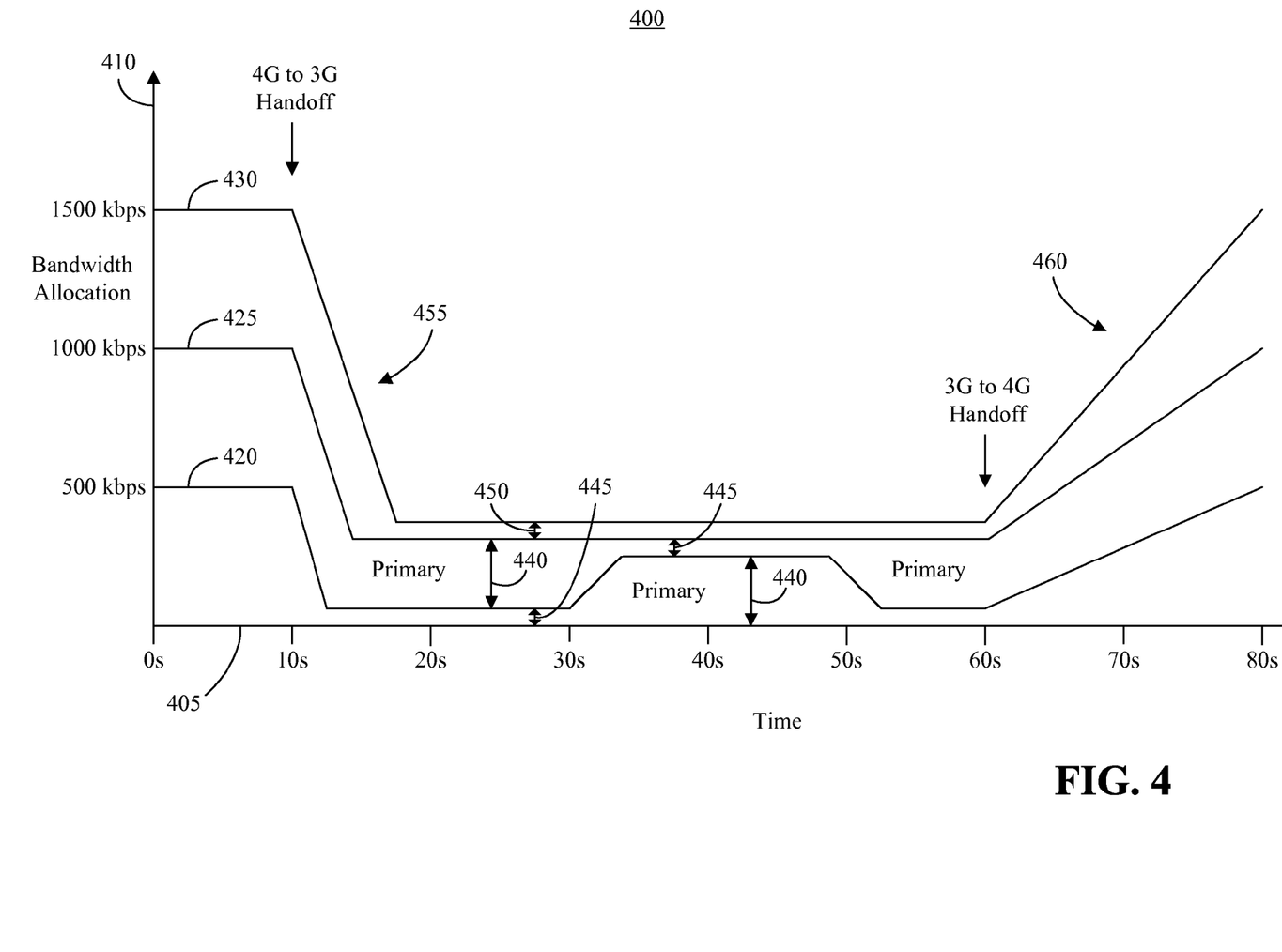
FIG. 4 is a chart depicting an example of video bandwidth allocation for communication of video information in a video conference, which is useful for understanding various arrangements described herein.

FIG. 4 is a chart 400 depicting an example of video bandwidth allocation for communication of video information in a video conference, which is useful for understanding various arrangements described herein. In the chart 400, the horizontal axis 405 represents time. The vertical axis 410 represents respective downlink video bandwidth allocations 420, 425, 430 for video information provided to a client device for audio information provided in the video conference by other client devices. More particularly, the vertical axis 410 represents total video bandwidth allocation due to successive summation of the respective downlink video bandwidth allocations 420, 425, 430.

In this example, assume that the total downlink bandwidth provided to the client device by 4G is greater than 1500 kbps, for instance 1800 kbps. Also assume total downlink bandwidth provided to the client device by 3G is 500 kbps. Initially, the client device can be connected to the communication network via a 4 G communication link. The 4 G communication link can provide sufficient bandwidth for the client device to receive video information generated by respective participants using other client devices with 500 kbps of video bandwidth allocated for each of the respective video information.

At time 10 s, the client device can commence handoff from a 4G base station to a 3G base station, which may not provide sufficient bandwidth for each of the respective video information to be communicated to the client device at 500 kbps. The video conference system can detect the handoff of the client device, either by receiving a message from the client device indicating the handoff, or by receiving a message from network infrastructure indicating the handoff. When the video conference system detects the handoff, the video conference system can allocate video bandwidth in the downlink for the various video information, as described herein. For example, the video conference system can detect which participant currently is the primary presenter, allocate a first level of video bandwidth 440 for video information provided by the primary presenter, and allocate a second level of video bandwidth 445 for video information provided by at least one other participant in the video conference. As noted, the second level of video bandwidth 445 is less that the first level of video bandwidth 440. A third level of video bandwidth 450 can be allocated for video information provided by yet another participant. Alternatively, that participant may be allocated the second level of video bandwidth 445. In one arrangement, the second level of video bandwidth 445 or the third level of video bandwidth 450 can be zero.

At time 30 s, another participant in the video conference can begin speaking, and providing more speech data than other participants in the video conference. The video conference system can analyze the speech generated in the video conference, for example to filter out spurious utterances such as laughter, limited remarks, etc., to determine whether the other participant actually has become the primary presenter in the video conference. If so, the video conference system can change the video bandwidth allocations to provide the first level of video bandwidth 440 for video information provided by the new primary presenter, and provide the second level of video bandwidth 445 (or the third level of video bandwidth 450) to the previous primary presenter. Thus, the total amount of video bandwidth used for communicating video information to the client device can remain within the capacity of the communication link between the client device and the 3G base station. For example, the sum of the video bandwidths 440, 445, 450 can be equal to the total video bandwidth capacity provided by the 3G base station.

Soon before time 50 s, the original primary presenter can again begin speaking, thus becoming the new primary presenter, and the video conference system can change the video bandwidth allocations to provide the first level of video bandwidth 440 for video information provided by that original primary presenter, while decreasing the video bandwidth allocation for the immediately previous primary presenter. At time 60 s, the client device can commence handoff from the 3G base station to the previous 4G base station or another 4G base station. The video conference system can detect such handoff, and commence increasing video bandwidth for video information provided by each of the other participants in the video conference.

In lieu of abruptly changing video bandwidth allocations, the video conference system can ramp the changes 455, 460 to the video bandwidth allocations at defined rates and/or over a defined periods. In illustration, a transcoder bitrate for transcoding the video information can be changed at a defined rate and/or over a defined period. By doing so, the video conference system can provide to the participants smooth video transitions. Moreover, if the handoffs are immediately reversed, or a change from one primary speaker to another immediately reverts, the video conference system can reverse the video bandwidth allocation changes before such changes have been fully implemented, thereby providing a smooth video conference presentation for the participant receiving the video information.

In one arrangement, upward changes 460 in bandwidth allocation can be implemented at a rate that is lower than downward changes 455, though the present arrangements are not limited in this regard. When available network bandwidth decreases, it may be necessary to reduce bandwidth allocations at least as quickly as the rate of the downward changes to available bandwidth to mitigate the risk of errors in transmission of the audio/video information. When the available network bandwidth increases, the risk of errors occurring in transmission of the audio/video information is relatively low. Thus, the upward changes 460 can be implemented at a lower rate than the downward changes 455 with minimal risk of transmission errors. By implementing upward changes 460 at a particular rate, fatigue of the participant viewing the downlink audio/video information and perceived reduced quality of the downlink audio/video information can be mitigated.

At this point it should be noted that the changes to video bandwidth allocation at time 10 s need not only be implemented due to a handoff of a client device. For example, such changes can be implemented when the client device experiences degraded network conditions, intermittent connection to a base station or poor coverage, significant error rates or packet loss, etc. Each of these conditions can indicate a decrease in network bandwidth available to communicate video conference information to the client device. When the network conditions improve, each of the video information can be provided to the client device at full data rate.

Further, the video bandwidth allocation scheme described in FIG. 4 can be applied to video information communicated to client devices individually based on the network bandwidth available to the respective client devices. For example, other client devices that remain connected to the communication network via a 4G base station, or that have good communication links, can continue to receive the video information from other participants at a full data rate, or data rates selected based upon respective communication environments. In another arrangement, however, the video bandwidth allocation scheme can be applied to all client devices participating in the video conference when any one of the client devices experiences a low network bandwidth condition due to handoff or degraded network conditions.

Figure 5:
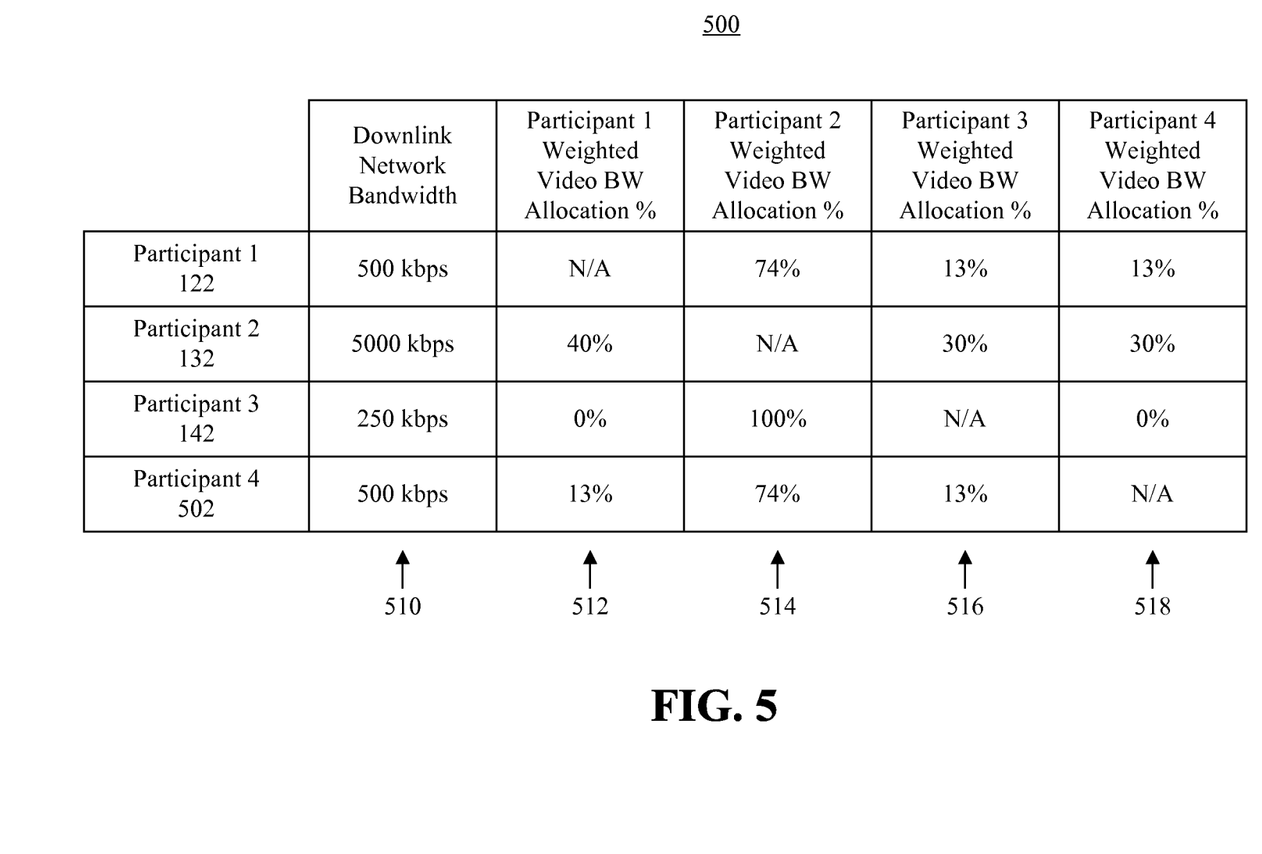
FIG. 5 is an example of a bandwidth distribution table, which is useful for understanding various arrangements described herein.

FIG. 5 is an example of a bandwidth distribution table (hereinafter "table") 500, which is useful for understanding various arrangements described herein. The table 500 can be accessed by a video codec used by the video conference system 110 (FIGS. 1 and 2) (e.g., via the video conferencing application 235 (FIG. 2) executed by the video conference system 110) to select video bandwidth allocations to communicate to respective participants 122, 132, 142, 502 video information generated during the video conference by other participants 122, 132, 142, 502. The video conference system 110 can monitor and update the table 500 as changes in the video conference, such as changes in audio activity and changes to downlink network bandwidths, are detected.

In the table 500, column 510 can indicate the downlink network bandwidth available to each of the respective participants 122, 132, 142, 502. In this example, in addition to the participants 122, 132, 142 described in FIG. 1, an additional participant 502 is described. That being said, the video conference can include any number of participants, and the present arrangements are not limited to these specific numbers of participants. For clarity, when referring particularly to any of the participants 122, 132, 142, 502 hereinafter, such participants will be referred to, respectively, as participant 1, participant 2, participant 3, and participant 4.

The respective columns 512, 514, 518, 516 can indicate, for each participant 122, 132, 142, 502, a weighted video bandwidth allocation for video information being communicated to other participants 122, 132, 142, 502 over respective downlink channels. The weighted video bandwidth allocations 512, 514, 516, 518 can be determined by the video conferencing system based upon how much audio information is currently being generated by each participant 122, 132, 142, 502 during the video conference. In illustration, the video conferencing system can monitor speech activity generated by each participant 122, 132, 142, 502 over a moving window (e.g., using a moving average and/or finite impulse response (FIR) filter) to obtain a weighted speech activity value over recent time. For instance, a speech activity detector can continually monitor speech, and sum or average the amount speech generated by each participant 122, 132, 142, 502 over the last second, two seconds, 5 seconds, ten seconds, etc. Such computations can be performed at any processing rate that is sufficient for the period being monitored in the moving window.

Based on the amount of audio information detected for each participant 122, 132, 142, 502 during the moving window, and the amount of downlink network bandwidth available to each of the participants 122, 132, 142, 502, the video conferencing system can dynamically allocate a portion of downlink video bandwidth for each participant 122, 132, 142, 502 to be used to communicate video information generated by other participants 122, 132, 142, 502.

In illustration, assume that participant 1 has 500 kbps of available downlink network bandwidth, participant 2 has 5000 kbps of available downlink network bandwidth, participant 3 has 250 kbps of available downlink network bandwidth, and participant 4 has 500 kbps of available downlink network bandwidth. The available bandwidth can be determined can be determined using TCP friendly rate control (TFRC), packet pair train dispersion (PPTD), or any other suitable method. Also assume that, based on the detected audio information, participant 2 is identified as being the primary presenter in the video conference.

For participant 1, video information generated by participant 2 can be allocated 74% of participant 1's downlink video bandwidth, and video information generated by participants 3 and 4 each can be allocated 13% of participant 1's available downlink video bandwidth. Thus, participant 1's total available downlink video bandwidth can be used in its entirety, while providing the greatest portion of that downlink video bandwidth to video information generated by the participant 2, who is the primary presenter.

It may not be necessary for participant 1 to receive from the video conference server his/her own video information since such information is generated, and can be processed, locally if participant 1 desires to view his/her own video information during the video conference. Whether to view his/her own video information can be a user selectable option. Hence, the entirety of the downlink video bandwidth available to participant 1 can be allocated to video information generated by other participants 132, 142, 502.

For participant 2, video information generated by participant 1 can be allocated 40% of participant 2's downlink video bandwidth, while video information generated by participants 3 and 4 each can be allocated 30% of participant 2's downlink video bandwidth. Participant 1 can be allocated a greater percentage of the downlink video bandwidth if participant 1 is generating more audio information than participants 3 and 4 during the moving window, which may tend to indicate that participant 1 currently is more active in the video conference. Again, downlink video bandwidth for participant 2 need not be allocated for video information participant 2 himself/herself generates.

For participant 3, the available downlink network bandwidth is rather low. Hence, since participant 2 is the primary presenter, 100% of participant 3's available downlink network bandwidth can be allocated to video information generated by participant 2. The video conference server can stop providing to participant 3 video information generated by participants 2 and 3 until a time when participant 3 has more available downlink network bandwidth. Again, downlink video bandwidth for participant 3 need not be allocated for video information participant 3 himself/herself generates.

For participant 4, video information generated by participant 2 can be allocated 74% of participant 1's downlink video bandwidth, and video information generated by participants 1 and 3 each can be allocated 13% of participant 4's available downlink video bandwidth. Again, downlink video bandwidth for participant 4 need not be allocated for video information participant 4 himself/herself generates.

The video bandwidth allocations can be performed in any suitable manner. In one non-limiting example, based on the amount of speech activity during the moving window, a weighted speech activity value can be generated for each participant 122, 132, 142, 502. In illustration, the speech activity for each participant 122, 132, 142, 502 during the window can be quantified. For each participant 122, 132, 142, 502, their quantified speech activity can be divided by a sum of the quantified speech activities for all participants 122, 132, 142, 502 to arrive at a weighted speech value, which corresponds to a percentage of speech data provided by each respective participant. The participant with the highest weighted speech value can be identified as the primary presenter. When determining the downlink video bandwidths for participant 1, the weighted speech values for participants 2, 3 and 4 can be normalized so that a sum of their normalized values equal 1. The normalized values then can be used to allocate respective downlink video bandwidths, as provided to participant 1, for the audio information provided by the participants 2, 3 and 4. For example, if the normalized value of the speech activity of participant 4 equals 0.13, 13% of the video bandwidth to participant 1 can be allocated for video information generated by participant 4, and so on. In the case of participant 3, however, where downlink bandwidth is severely limited, 100% of the video bandwidth can be allocated to the primary presenter, which in this example is participant 2. Thus, streaming video information from presenters 1 and 4 to participant 3 is not provided.

As the moving averages and/or network conditions change, downlink video bandwidths indicated in table 500 can be updated in real time. Accordingly, the video conference system can commence reallocation of corresponding downlink video bandwidths to the respective client devices in real time. As used herein, the term "real time" means a level of processing responsiveness that a user or system senses as sufficiently immediate for a particular process or determination to be made, or that enables the processor to keep up with some external process.

Figure 6:
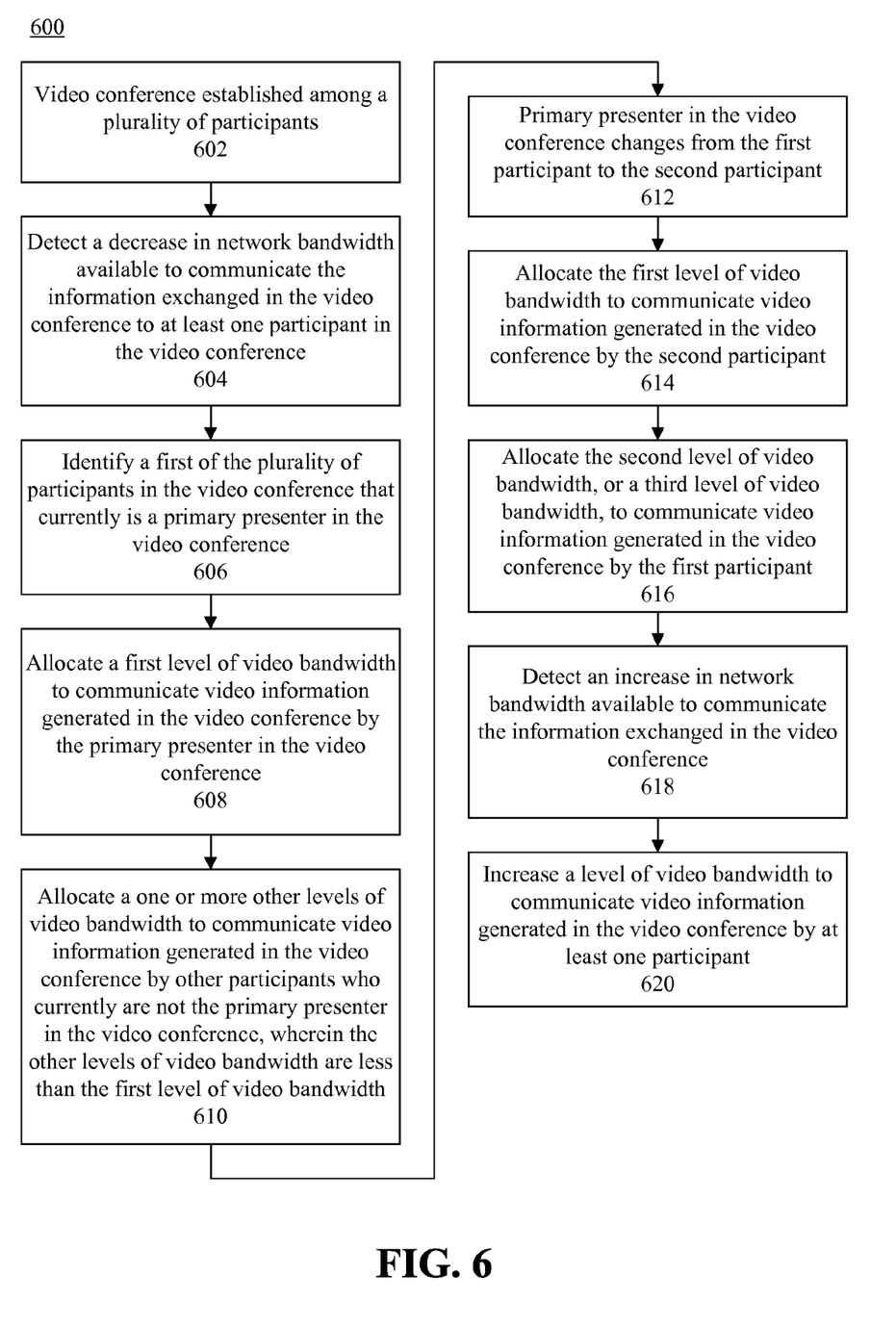
FIG. 6 is a flowchart presenting a method of communicating information exchanged in a video conference, which is useful for understanding various arrangements described herein.

FIG. 6 is a flowchart presenting a method 600 of communicating information exchanged in a video conference, which is useful for understanding various arrangements described herein. At step 602, a video conference can be established among a plurality of participants. At step 604, a decrease in network bandwidth available to communicate the information exchanged in the video conference to at least one participant in the video conference can be detected.

Responsive to detecting the decrease in network bandwidth available to communicate the information exchanged in the video conference to at least one participant in the video conference, at step 606 a first of the plurality of participants in the video conference that currently is a primary presenter in the video conference can be identified. In illustration, the participant who currently is generating the greatest amount of audio information (e.g., speech data), can be can be identified as the primary presenter. At step 608, a first level of video bandwidth to communicate video information generated in the video conference by the primary presenter in the video conference can be allocated. At step 610 one or more other levels of video bandwidth can be allocated to communicate video information generated in the video conference by at least a second participant who currently is not the primary presenter in the video conference, wherein the other levels of video bandwidth are less than the first level of video bandwidth.

At step 612, the primary presenter in the video conference can change from the first participant to the second participant. As noted, such change can be detected by monitoring an amount of audio information, such as speech activity, generated by each of the participants in the video conference, and detecting a change in the amount of audio information generated by at least one of the participants. Responsive to the change being detected, the participant currently generating the greatest amount of audio information (ignoring spurious events such as laughter, etc.) can be identified as the new primary presenter.

At step 614 the first level of video bandwidth can be allocated to communicate video information generated in the video conference by the second participant. At step 616 the second level of video bandwidth, or a third level of video bandwidth, can be allocated to communicate video information generated in the video conference by the first participant.

At step 618 an increase in network bandwidth available to communicate the information exchanged in the video conference can be detected. At step 620, the level(s) of video bandwidth to communicate video information generated in the video conference by at least one participant can be increased. For example, the level of video bandwidth allocated to the first participant can be increased to the first level of video bandwidth, or to another suitable level of video bandwidth. Levels of video bandwidth allocated to other participants also can be increased, though this need not be the case. The process can return to step 604 if a decrease in network bandwidth is detected, and the process can continue while the video conference remains established. The process can end when the video conference ends.

Figure 7:
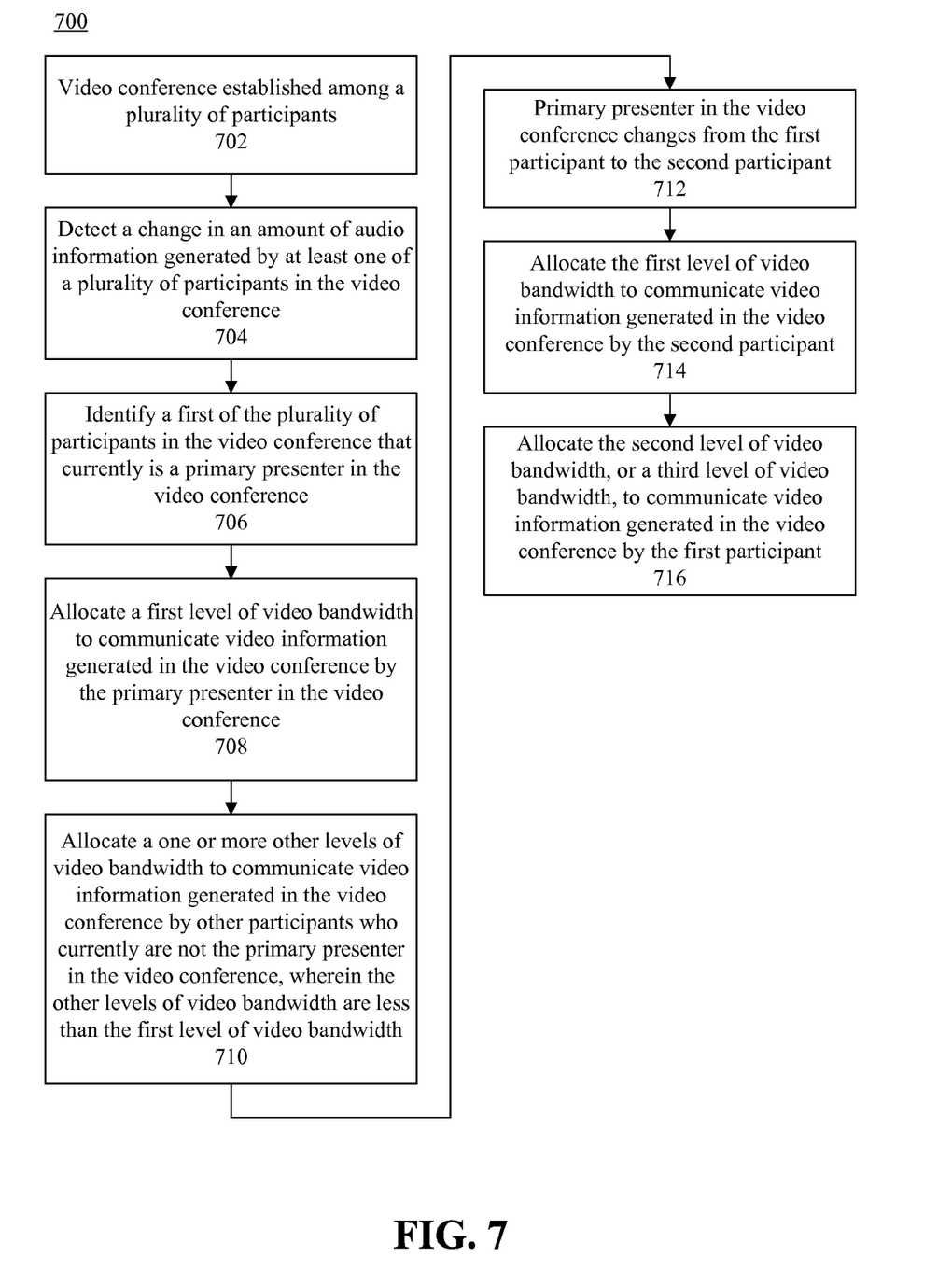
FIG. 7 is a flowchart presenting a method of communicating information exchanged in a video conference, which is useful for understanding various arrangements described herein.

FIG. 7 is a flowchart presenting a method 700 of communicating information exchanged in a video conference, which is useful for understanding various arrangements described herein. At step 702, a video conference can be established among a plurality of participants. At step 704, a change in an amount of audio information generated by at least one of a plurality of participants in the video conference can be detected.

Responsive to detecting the change in the amount of audio information generated by at least one of a plurality of participants in the video conference, at step 706 a first of the plurality of participants in the video conference that currently is a primary presenter in the video conference can be identified. In illustration, the participant who currently is generating the greatest amount of audio information (e.g., speech data), can be can be identified as the primary presenter. At step 708, a first level of video bandwidth to communicate video information generated in the video conference by the primary presenter in the video conference can be allocated. At step 710 one or more other levels of video bandwidth can be allocated to communicate video information generated in the video conference by at least a second participant who currently is not the primary presenter in the video conference, wherein the other levels of video bandwidth are less than the first level of video bandwidth.

At step 712, the primary presenter in the video conference can change from the first participant to the second participant. As noted, such change can be detected by monitoring an amount of audio information, such as speech activity, generated by each of the participants in the video conference, and detecting a change in the amount of audio information generated by at least one of the participants. Responsive to the change being detected, the participant currently generating the greatest amount of audio information (ignoring spurious events such as laughter, etc.) can be identified as the new primary presenter.

At step 714 the first level of video bandwidth can be allocated to communicate video information generated in the video conference by the second participant. At step 716 the second level of video bandwidth, or a third level of video bandwidth, can be allocated to communicate video information generated in the video conference by the first participant. The process can return to step 704 and continue while the video conference remains established. The process can end when the video conference ends.

Figure 8:
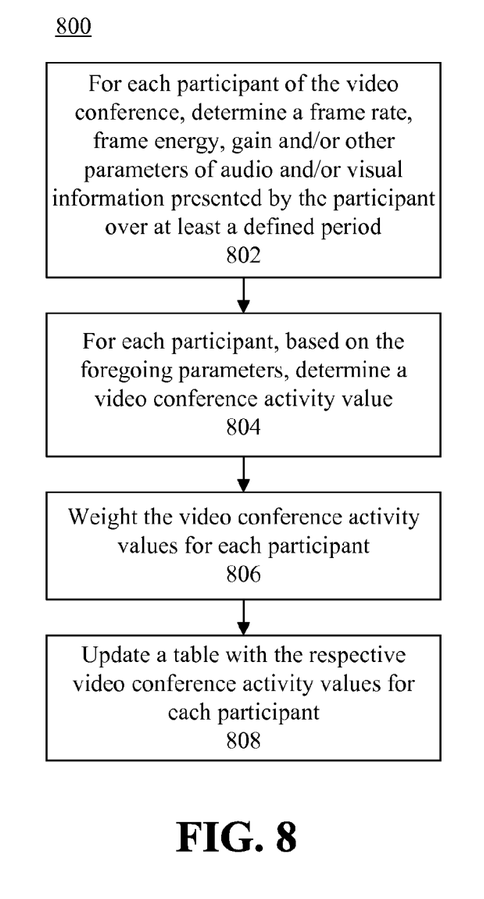
FIG. 8 is a flowchart presenting a method of calculating video conference activity, which is useful for understanding various arrangements described herein.

FIG. 8 is a flowchart presenting a method 800 of calculating video conference activity, which is useful for understanding various arrangements described herein. The video conference activity can be processed by the video conference system to identify the participant in the video conference who currently is the primary presenter in the video conference, and to determine when the role of primary presenter changes from one participant to another.

At step 802, for each participant of the video conference, a frame rate, a voice activity detection (VAD) indicator, frame energy, gain, finite impulse response (FIR), moving average of audio and/or video data, and/or other parameters of audio and/or visual information presented by the participant over at least a defined period can be determined. At step 804, for each participant, based on the foregoing parameters, a video conference activity value can be determined. At step 806, the video conference activity values for each participant can be weighted. At step 808, a table can be updated with the respective video conference activity values for each participant. This table can be periodically accessed or continually monitored to by the video conference system to determine which participant has the greatest video conference activity value at any point in time, and select that participant as the primary presenter.

As audio activity in the video conference changes over the span of the video conference, the video conference system can adjust its determination as to who if the primary presenter. Such determination need not be based on instantaneous peaks of audio/video information being generated by the respective participants. In illustration, the video conference activity values can be based on a moving average over a defined period, thereby minimizing (or filtering out) the impact of spontaneous or spurious audio/video information (e.g., audio information such as laughter, spurious comments, etc.) on the video conference activity values.

Figure 9:
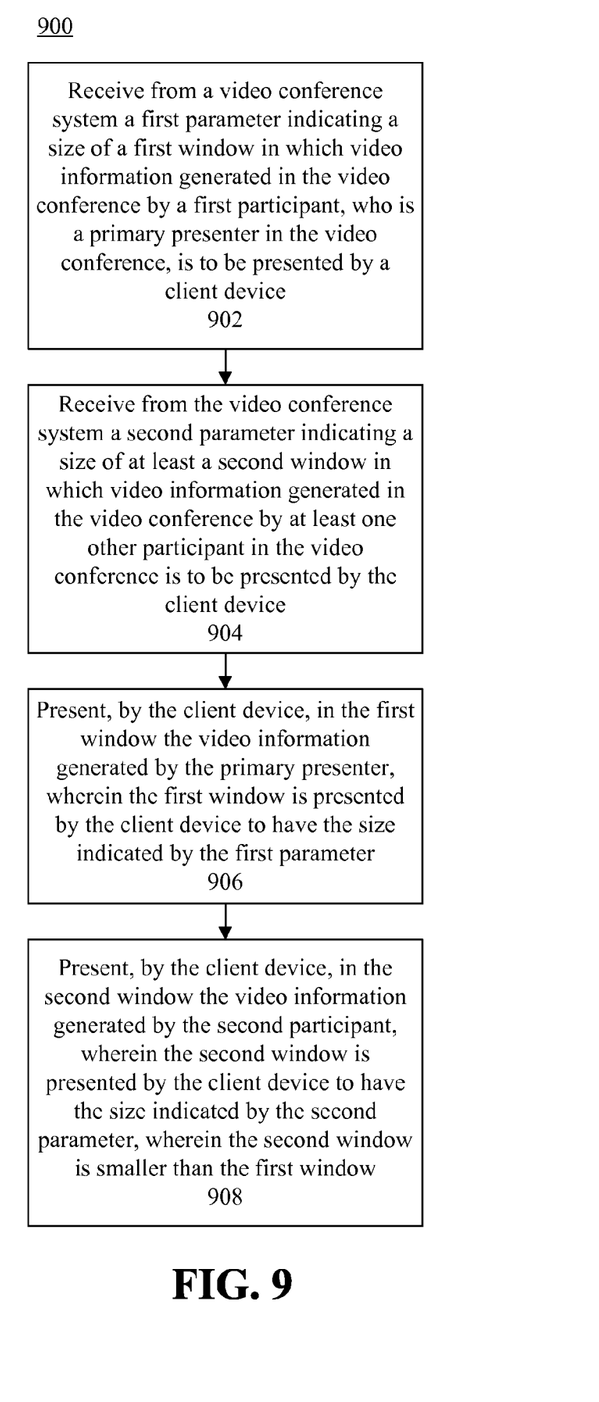
FIG. 9 is a flowchart presenting a method of receiving information exchanged in a video conference, which is useful for understanding various arrangements described herein.

FIG. 9 is a flowchart presenting a method 900 of receiving information, by a client device such as shown in FIG. 1, and exchanged in a video conference, which is useful for understanding various arrangements described herein. At step 902, a first parameter can be received from a video conference system. The first parameter can indicate a size of a first window in which video information generated in the video conference by a first participant, who is a primary presenter in the video conference, is to be presented by a client device. At step 904, a second parameter can be received from the video conference system. The second parameter can indicate a size of at least a second window in which video information generated in the video conference by at least one other participant in the video conference is to be presented by the client device.

At step 906, the video information generated by the primary presenter can be presented by the client device in the first window. The first window can be presented by the client device to have the size indicated by the first parameter. At step 908, the video information generated by the second participant can be presented by the client device in the second window. The second window can be presented by the client device to have the size indicated by the second parameter. In this regard, the second window can be smaller than the first window.

The flowcharts and block diagrams in the figures illustrate the architecture, functionality, and operation of possible implementations of systems, methods and computer program products according to various embodiments described herein.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present embodiments can be realized in hardware, or a combination of hardware and software. The present embodiments can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-readable (or computer-usable) program code that, when being loaded and executed by one or more processors, controls the processing system such that it carries out the methods described herein. The present embodiments also can be embedded in a computer program product comprising a non-transitory computer-readable storage medium, readable by a machine, tangibly embodying a program of instructions executable by the processing system to perform methods and processes described herein. The present embodiments also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, and so on) distinguish participant, audio/video stream, or the like from another participant, audio/video stream, or the like. Thus, an ordinal term used herein need not indicate a specific position in an ordinal series. For example, a participant identified as a "second participant" may join a video conference before a participant identified as a "first participant." Further, one or more participants may join the video conference between the second participant and the first participant.

These embodiments can be embodied in other forms without departing from the spirit or essential attributes thereof. Accordingly, reference should be made to the following claims, rather than to the foregoing specification, as indicating the scope of the embodiments.

What is claimed is:

1. A method of communicating information exchanged in a video conference, the method comprising:
    responsive to detecting a change in an amount of audio information generated by at least one of a plurality of participants in the video conference:
        identifying a first of the plurality of participants in the video conference that currently is a primary presenter in the video conference,
        allocating a first level of video bandwidth to communicate video information generated in the video conference by the primary presenter in the video conference, and
        allocating a second level of video bandwidth to communicate video information generated in the video conference by at least a second participant who currently is not the primary presenter in the video conference including:
            (i) communicating at least one message to a video encoder that encodes video information generated by the second recipient to encode the video information at a bit rate not to exceed a threshold value,
            (ii) receiving the video information generated by the second participant at the bit rate, and
            (iii) communicating the video information generated by the second participant to participants in the video conference,
        wherein the second level of video bandwidth is less than the first level of video bandwidth, and wherein the second level of video bandwidth is greater than zero; and
    responsive to detecting an increase in network bandwidth available to communicate the information exchanged in the video conference:
        increasing a level of video bandwidth to communicate video information generated in the video conference by the second participant from the second level of video bandwidth to the first level of video bandwidth or to a third level of video bandwidth, wherein the third level of video bandwidth is greater than the second level of video bandwidth.

2. The method of claim 1, wherein identifying the first of the plurality of participants in the video conference that currently is a primary presenter in the video conference comprises:
    detecting audio information generated by each of the plurality of participants during the video conference;
    determining which of the plurality of participants is generating the greatest amount of audio information; and
    identifying the participant that is generating the greatest amount of audio information as the primary presenter in the video conference.

3. The method of claim 1, wherein identifying a first of the plurality of participants in the video conference that currently is a primary presenter in the video conference comprises:
    detecting a visual presentation presented during the video conference;
    determining which of the plurality of participants is providing the visual presentation; and
    identifying the participant that is providing the visual presentation as the primary presenter in the video conference.

4. The method of claim 1, further comprising:
    responsive to identifying the primary presenter in the video conference changing from the first participant to the second participant in the video conference:

allocating the first level of video bandwidth to communicate video information generated in the video conference by the second participant; and
allocating the second level of video bandwidth to communicate video information generated in the video conference by the first participant.

5. The method of claim 1, further comprising:
responsive to detecting a decrease in network bandwidth available to communicate the information exchanged in the video conference:
decreasing a level of video bandwidth to communicate video information generated in the video conference by the second participant from the second level of video bandwidth to a fourth level of video bandwidth, wherein the fourth level of video bandwidth is less than the second level of video bandwidth.

6. The method of claim 1, wherein increasing the level of video bandwidth to communicate information generated in the video conference by the second participant comprises:
ramping up, over a period of time and at a defined rate, the level of video bandwidth that is increased.

7. The method of claim 1, further comprising:
detecting audio information generated by each of the plurality of participants during the video conference; and
ranking each of the plurality of participants based on an amount of audio information each of the plurality participants currently is generating;
wherein allocating the first and second levels of video bandwidth comprises allocating video bandwidth for audio information generated by each of the plurality of participants based on each participant's respective ranking.

8. A method of communicating information exchanged in a video conference, the method comprising:
responsive to detecting a decrease in network bandwidth available to communicate the information exchanged in the video conference to at least one participant in the video conference:
identifying a first of the plurality of participants in the video conference that currently is a primary presenter in the video conference based on an amount of audio information generated by the primary presenter in the video conference;
allocating a first level of video bandwidth to communicate video information generated in the video conference by the primary presenter in the video conference; and
allocating a second level of video bandwidth to communicate video information generated in the video conference by at least a second participant who currently is not the primary presenter in the video conference, wherein the second level of video bandwidth is less than the first level of video bandwidth, wherein the second level of video bandwidth is greater than zero.

9. A video conference system comprising:
a processor configured to initiate executable operations comprising:
responsive to detecting a change in an amount of audio information generated by at least one of a plurality of participants in the video conference:
identifying a first of the plurality of participants in the video conference that currently is a primary presenter in the video conference including:
(i) detecting a visual presentation presented during the video conference,
(ii) determining which of the plurality of participants is providing the visual presentation, and
(iii) identifying the participant that is providing the visual presentation as the primary presenter in the video conference,
allocating a first level of video bandwidth to communicate video information generated in the video conference by the primary presenter in the video conference, and
allocating a second level of video bandwidth to communicate video information generated in the video conference by at least a second participant who currently is not the primary presenter in the video conference, wherein the second level of video bandwidth is less than the first level of video bandwidth, wherein the second level of video bandwidth is greater than zero; and
responsive to detecting an increase in network bandwidth available to communicate the information exchanged in the video conference:
increasing a level of video bandwidth to communicate video information generated in the video conference by the second participant from the second level of video bandwidth to the first level of video bandwidth or to a third level of video bandwidth, wherein the third level of video bandwidth is greater than the second level of video bandwidth.

10. The video conference system of claim 9, wherein identifying which of the plurality of participants in the video conference currently is the primary presenter in the video conference further comprises:
detecting audio information generated by each of the plurality of participants during the video conference;
determining which of the plurality of participants is generating the greatest amount of audio information; and
identifying the participant that is generating the greatest amount of audio information as the primary presenter in the video conference.

11. The video conference system of claim 9, the processor further configured to initiate executable operations comprising:
responsive to identifying the primary presenter in the video conference changing from the first participant to the second participant in the video conference:
allocating the first level of video bandwidth to communicate video information generated in the video conference by the second participant; and
allocating the second level of video bandwidth to communicate video information generated in the video conference by the first participant.

12. The video conference system of claim 9, the processor further configured to initiate executable operations comprising:
responsive to detecting a decrease in network bandwidth available to communicate the information exchanged in the video conference:
decreasing a level of video bandwidth to communicate video information generated in the video conference by the second participant from the second level of video bandwidth to a fourth level of video bandwidth, wherein the fourth level of video bandwidth is less than the second level of video bandwidth.

13. The video conference system of claim 9, wherein increasing the level of video bandwidth to communicate information generated in the video conference by the second participant comprises:
ramping up, over a period of time and at a defined rate, the level of video bandwidth that is increased.

14. The video conference system of claim 9, the processor further configured to initiate executable operations comprising:
- detecting audio information generated by each of the plurality of participants during the video conference; and
- ranking each of the plurality of participants based on an amount of audio information each of the plurality participants currently is generating;
- wherein allocating the first and second levels of video bandwidth comprises allocating video bandwidth for audio information generated by each of the plurality of participants based on each participant's respective ranking.

15. The video conference system of claim 9, wherein allocating the second level of video bandwidth to communicate video information generated in the video conference by the second participant comprises:
- communicating at least one message to a video encoder that encodes video information generated by the second recipient to encode the video information at a bit rate not to exceed a threshold value;
- receiving the video information generated by the second participant at the bit rate; and
- communicating the video information generated by the second participant to participants in the video conference.

16. A computer-implemented method, comprising:
- identifying, by a computing system, a first participant of a plurality of participants in a video conference that is currently a primary presenter in the video conference;
- allocating, by the computing system, a first level of video bandwidth to communicate video information generated in the video conference by the primary presenter in the video conference;
- allocating, by the computing system, a second level of video bandwidth to communicate video information generated in the video conference by at least a second participant of that plurality of participants that is not currently the primary presenter in the video conference, wherein the second level of video bandwidth is less than the first level of video bandwidth and greater than zero, the allocating including:
  - (i) obtaining, from a video encoder that encodes video information generated by the second recipient, video information generated by the second recipient at a bit rate not to exceed a threshold value, and
  - (ii) communicating the video information to other participants in the video conference; and
- in response to a change in a network bandwidth available to communicate the information generated in the video conference, adjusting, by the computing system, the second level of video bandwidth.

17. The computer-implemented method of claim 16, wherein adjusting the second level of video bandwidth includes increasing, by the computing system, the second level of video bandwidth in response to an increase in the network bandwidth.

18. The computer-implemented method of claim 16, wherein adjusting the second level of video bandwidth includes decreasing, by the computing system, the second level of video bandwidth in response to a decrease in the network bandwidth.

* * * * *